United States Patent
Horiuchi

(10) Patent No.: US 7,170,544 B2
(45) Date of Patent: Jan. 30, 2007

(54) FREQUENCY MODULATOR FOR MODULATING IMAGE DATA BASED ON FREQUENCY DATA OF SCAN LINES OF AN IMAGE CARRIER

(75) Inventor: Izuru Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 10/835,745

(22) Filed: Apr. 29, 2004

(65) Prior Publication Data

US 2004/0227807 A1 Nov. 18, 2004

(51) Int. Cl.
*B41J 2/435* (2006.01)

(52) U.S. Cl. .................. 347/247; 347/249; 347/250

(58) Field of Classification Search ............ 347/247, 347/249, 250, 261; 359/201
See application file for complete search history.

(56) References Cited

U.S. PATENT DOCUMENTS

| 5,822,105 A * | 10/1998 | Kodama et al. ............ 359/201 |
| 5,933,184 A * | 8/1999 | Ishigami et al. ............ 347/249 |
| 6,052,143 A * | 4/2000 | Yoshino et al. ............ 347/261 |
| 6,157,400 A * | 12/2000 | Genovese ............ 347/250 |
| 2004/0174428 A1* | 9/2004 | Seki et al. ............ 347/250 |

FOREIGN PATENT DOCUMENTS

| JP | H02-282763 A | 11/1990 |
| JP | H05-203889 A | 8/1993 |
| JP | H09-218370 A | 8/1997 |

\* cited by examiner

*Primary Examiner*—Hai Pham
*Assistant Examiner*—Carlos Martinez, Jr.
(74) *Attorney, Agent, or Firm*—Canon U.S.A. Inc I.P. Div

(57) ABSTRACT

A frequency modulation device for use in an image forming apparatus. The image formation apparatus includes an image carrier and a laser device for scanning the image carrier along a plurality of scan lines. Each scan line is divided into segments having segment boundaries in which the same segment boundary in adjacent scan lines are offset. The frequency modulation device generates frequency data for use in modulating the input image data, which is utilized by the laser device to scan the image carrier, which permits output of an electrophotograph of high image quality by suppressing segment boundaries caused by moiré fringes or color shifting to below a level at which such boundaries are not visually detectable.

13 Claims, 10 Drawing Sheets

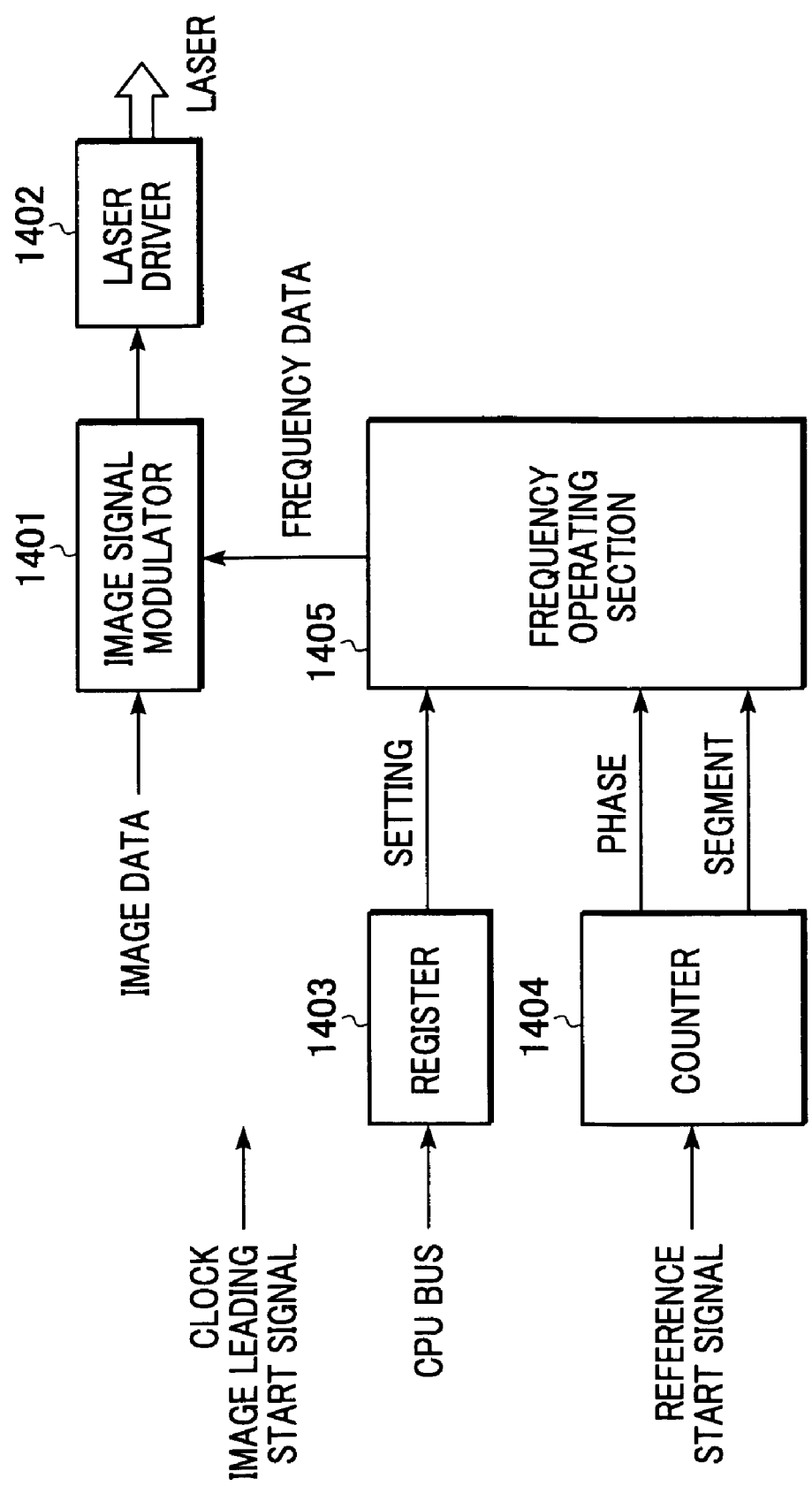

FREQUENCY MODULATOR FOR MODULATING IMAGE DATA BASED ON FREQUENCY DATA OF SCAN LINES OF AN IMAGE CARRIER

BACKGROUND OF THE INVENTION

1. Field of the Invention

The present invention relates to a frequency modulator which generates an image clock used for ON/OFF control of a laser beam scanning the surface of an image carrier such as a photosensitive drum.

2. Description of the Related Art

In an electrophotographic image forming device, it is conventional to scan an entire document placed on a table by means of a longitudinal fluorescent member and an integrally formed mirror in longitudinal and vertical sub-scanning directions. The beam emitted from the fluorescent member is reflected to the original, is reflected by an integral mirror and other installed mirrors, and enters into a photoelectric conversion sensor. A digital image is obtained through AD conversion. Through decoding of the received data in a facsimile machine, and through expansion processing of the code in a printer, the resultant digital images are stored in a hard disk or a memory. The digitized image data undergoes image processing according to desired output properties, and then modulated and converted again by a laser drive into light.

FIG. 10 schematically illustrates an optical system for output. A laser device 1003 emits a laser beam onto a polygon mirror 1001. The polygon mirror 1001, rotationally driven by a motor (not shown), reflects the laser beam onto a photosensitive drum 1002 so as to scan the drum 1002 along a straight line. The components of the optical system are arranged in a three-dimensional arrangement such that only the laser beam reflected off the polygon mirror 1001 passes through an fθ lens 1005.

When the polygon mirror 1001 rotates at a constant speed, the scanning rate at the surface of the drum 1002 near the center of the polygon mirror 1001 tends to be slower than at the longitudinal ends of the drum 1002, which is more distant from the center of the polygon mirror 1001. However, the fθ lens 1005 cancels this tendency via refraction of light, thus ensuring that the laser beam passes over the surface of the drum 1002 at a constant speed. In FIG. 4, the solid line represents the laser beam speed characteristics, and the dotted line represents an ideal curve after correction. In general, however, it is difficult to achieve such ideal lens properties because of cost restrictions and the like. The resulting error components are a factor causing deterioration of the image quality in the form of distortion and color shifting in a color electrophotographic device. Each face of the polygon mirror 1001 corresponds to one scanning line.

Referring back to FIG. 10, a laser detector 1004, arranged by the side of the photosensitive drum 1002, detects the reference position of the laser, and serves as a sensor for determining an irradiating period of image information from the laser device 1003. The photosensitive drum 1002 forms a latent image as a surface potential by receiving laser irradiation while rotating. Then, a toner image is formed on a medium such as paper, through adhesion and transfer of toner. After fixing the toner onto the medium, the toner image is discharged.

A method for replacing the fθ lens or improving the image quality by intensifying properties of the fθ lens by causing a gradual change in clock frequency for modulating the image signal has been devised. The pixel pitch in the absence of an fθ lens is wider at the drum center and narrower at the ends, as shown in FIG. 9, under the effect of the laser scanning rate shown in FIG. 4. A higher modulation frequency leads to a narrower pixel pitch after forming the latent image, and a lower modulation frequency results in a wider pixel pitch, as shown in FIG. 8.

By use of this relationship, unevenness of the pixel pitch caused by the absence of an fθ lens can be corrected by controlling the modulation frequency. Similarly, even in the presence of an fθ lens, a correction error can be corrected.

When realizing the above-mentioned means by hardware circuits, it is not desirable, from cost considerations, to have a memory for one line for storing the correction curve.

A conceivable solution to this problem is to provide an IC for laser output based on a method of making a correction using an approximate curve by dividing a line into segments comprising a plurality of pixels. The method comprises the steps of counting pixels scanned in one line, generating timings for segment boundaries, storing in advance only modulation frequencies at ends of the segments, calculating the intervals by linear interpolation, and outputting the modulation frequencies. Another conceivable method is to store the modulation frequency for each segment, and to make a correction to a certain value within each segment. In FIGS. 5 and 6, the abscissa represents the position on the photosensitive drum. The main scanning lines are divided into segments A to G, and a correction as shown by a solid line is conducted relative to the ideal curve represented by the dotted line.

(For example, Japanese Patent Laid-Open No. 05-203889).

In a correction made in unit segments, however, correction errors tend to occur, and at segment boundaries, changes in the amount of error are discontinuous, that is, not smooth. FIG. 7 illustrates errors occurring when making a correction with a constant value within each segment. As shown, steps are observed between the amounts of error at segment boundaries. Since the pixel pitch exerts a visual influence, such as the occurrence of moiré fringes, frequency distribution, or color shifting, the generation condition of moiré fringes or color shifting may change suddenly at segment boundaries.

Furthermore, the above-mentioned control has a problem in that, the segment boundaries, which line up along a straight line in a direction perpendicular to the main scanning direction of the laser (hereinafter referred to as the "sub-scanning direction"), are visually easily detectable.

For the purpose of avoiding occurrence of a similar phenomenon, Japanese Patent Laid-Open No. 9-218370 proposes a method of performing control so that positions of correction pixels do not form a line in the sub-scanning direction. In the segment processing method of the present application which conducts correction for all pixels in the lines, practical application is impossible.

SUMMARY OF THE INVENTION

The present invention is directed to a frequency modulation device for use in an image formation apparatus in which an image carrier of the image formation apparatus is scanned on a plurality of scan lines having segment boundaries such that moiré fringes or color shifting is minimized to a level at which the segment boundaries are not visually detectable, and therefore providing an image forming apparatus which permits output of an electrophotograph having a high image quality. The image formation apparatus includes a laser device for scanning the image carrier along the plurality of scan lines under control of the frequency modulation device.

In one aspect of the present invention, each scan line is divided such that the segment boundaries in adjacent scan lines are offset with each other. In one embodiment, the plurality of scan lines are divided into a same number of segments. In another embodiment, adjacent scan lines are divided into different number of segments.

In another aspect of the present invention, the frequency modulation device includes means for storing frequency information for each segment of a scan line. In one embodiment, the frequency information includes frequency at the segment boundaries. In another embodiment, the frequency information includes frequency within each segment. In another embodiment, the frequency information includes the average value of amount of correction within each segment.

In yet another aspect, the frequency modulation device includes means for generating frequency data based on the stored frequency information. In one embodiment, generating means includes a counter generating data including line phase data and segment data and a frequency calculator calculating the frequency data based on the frequency information and the data from the counter. In one embodiment, the data further includes phase data within each segment.

The above and other objects, features, and advantages of the invention will become more apparent from the following detailed description taken in conjunction with the accompanying drawings.

BRIEF DESCRIPTION OF THE DRAWINGS

FIG. 14 is a block diagram of the image signal modulation circuit in accordance with one embodiment of the present invention.

DESCRIPTION OF THE PREFERRED EMBODIMENTS

Figure 1:
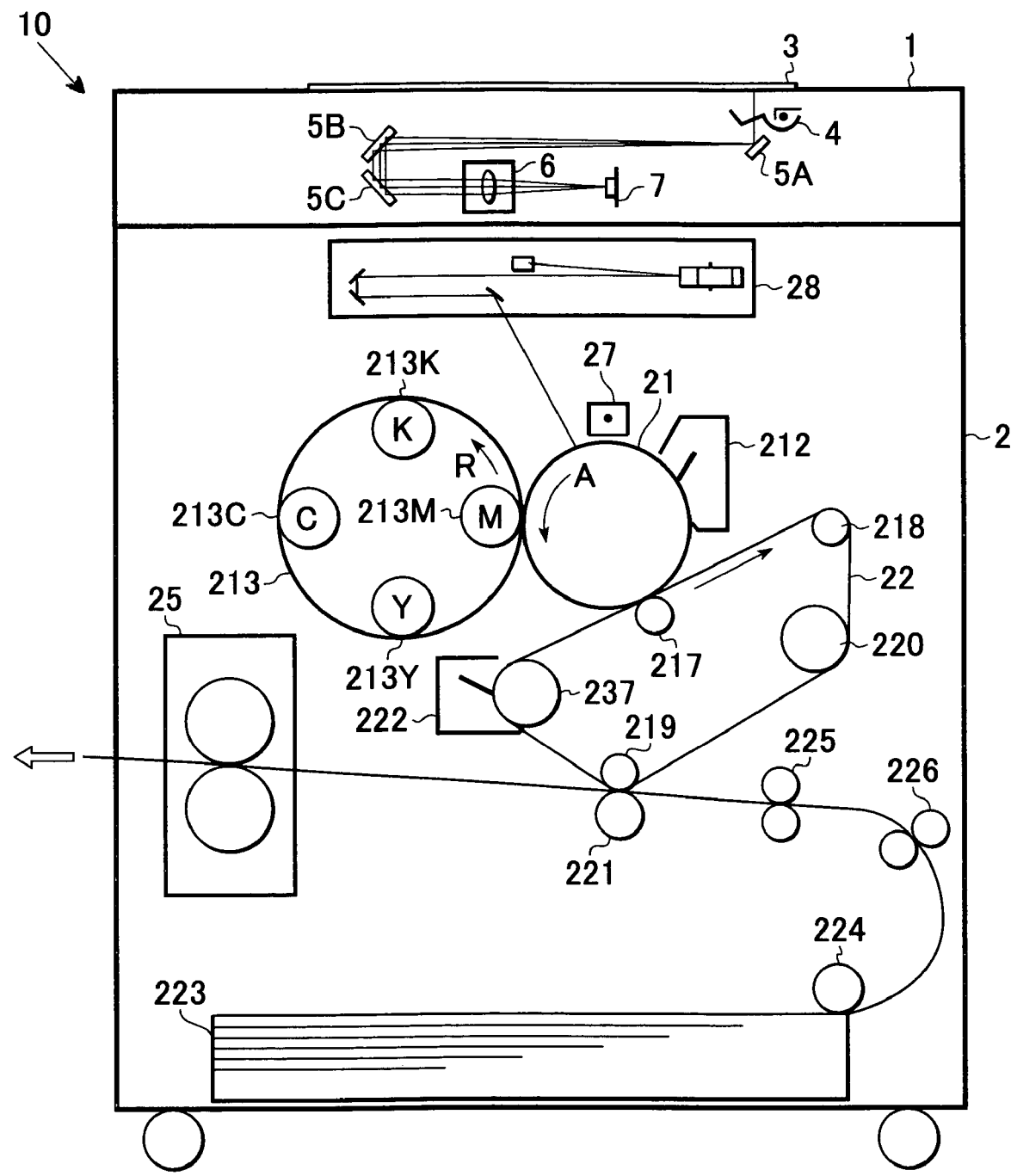
FIG. 1 is a schematic view of an image forming apparatus in accordance with one embodiment of the present invention.

The present invention will now be described in detail below with reference to the accompanying drawings showing embodiments thereof. In the drawings, elements and parts which are identical throughout the views are designated by identical reference numerals, and duplicate description thereof is omitted.

FIG. 1 is a schematic view of a color image forming apparatus 10 in accordance with one embodiment of the present invention. The image forming apparatus 10 includes a color image reader (hereinafter referred to as a "color scanner") 1 and a color image recorder (hereinafter referred to as a "color printer") 2.

The above-mentioned color scanner 1 includes an illuminating lamp 4 for forming an image of an original document 3. The formed image is focused to a color sensor 7 via mirrors 5A, 5B and 5C and a lens 6. The color scanner 1 reads color image information from the original document 3 for each component of, for example, color-separated light including blue (hereinafter referred to as "B"), green (hereinafter referred to as "G"), and red (hereinafter referred to as "R"). The color scanner 1 then converts the read information into electrical image signals. On the basis of the B, G, and R color-separated image signal intensity levels obtained from the color scanner 1, an image processing unit (not shown) performs color conversion processing, thereby providing color image data of black (hereinafter referred to as "Bk"), cyan (hereinafter referred to as "C"), magenta (hereinafter referred to as "M"), and yellow (hereinafter referred to as "Y").

In the above-mentioned color printer 2, a write optical unit 28 converts the color image data from the color scanner 1 into an optical signal, performs optical writing corresponding to the original image, and forms an electrostatic latent image on a photosensitive member 21 functioning as an image carrier.

Figure 3:
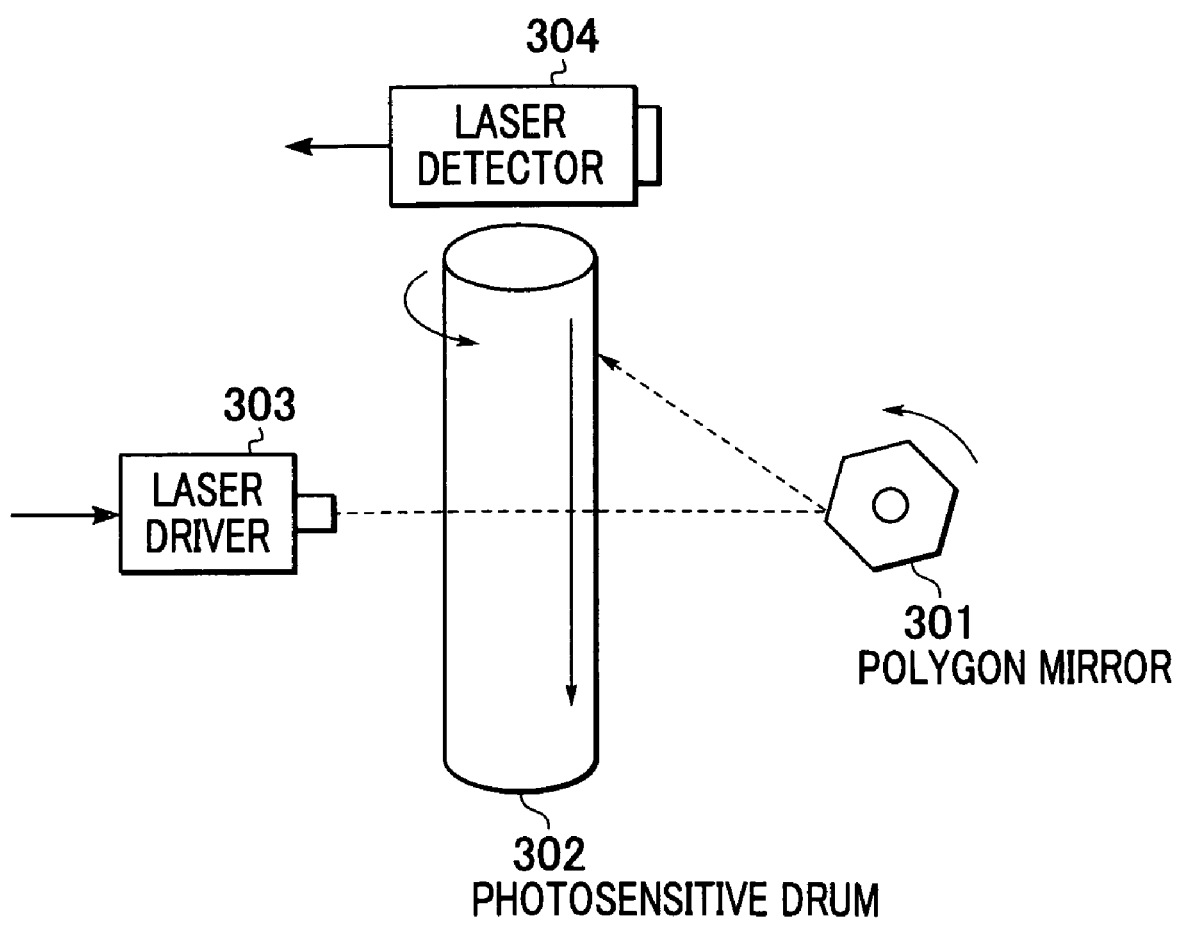
FIG. 3 is a schematic view of the write optical unit.
Figure 4:
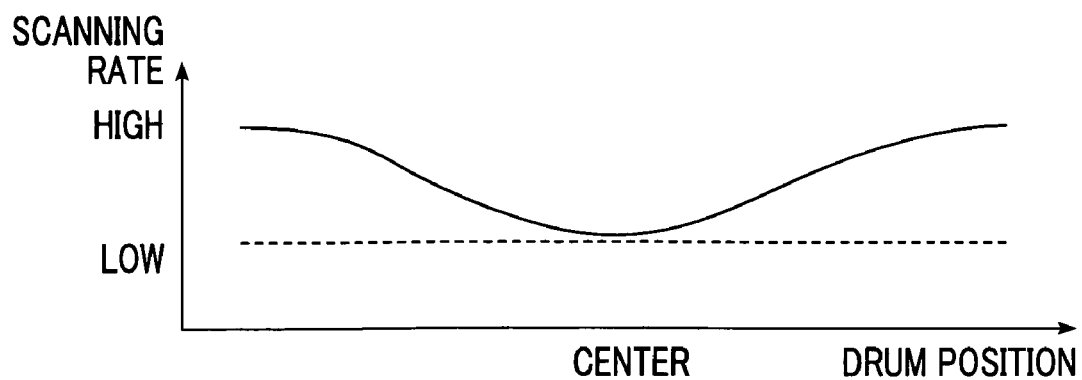
FIG. 4 is a graph illustrating the relationship between the drum scanning position and the laser scanning rate.
Figure 5:
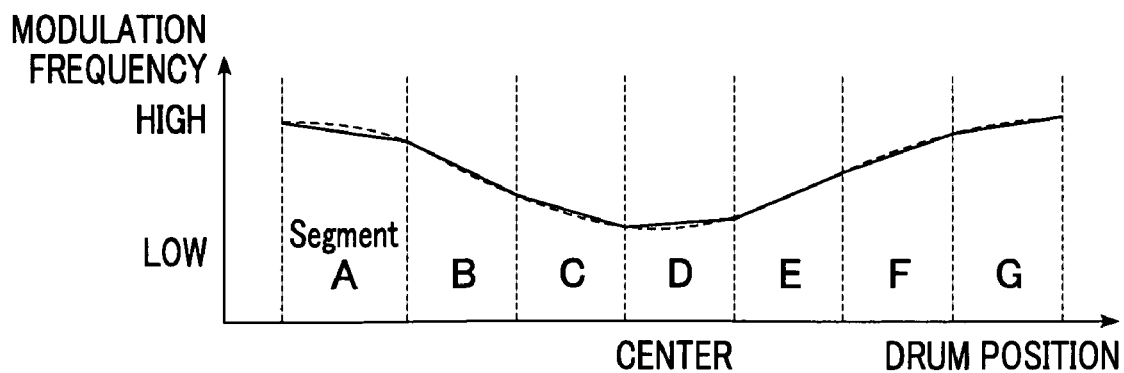
FIG. 5 is a graph illustrating the relationship between the drum position and the modulation frequency, and showing the laser scanning rate and the correction.
Figure 6:
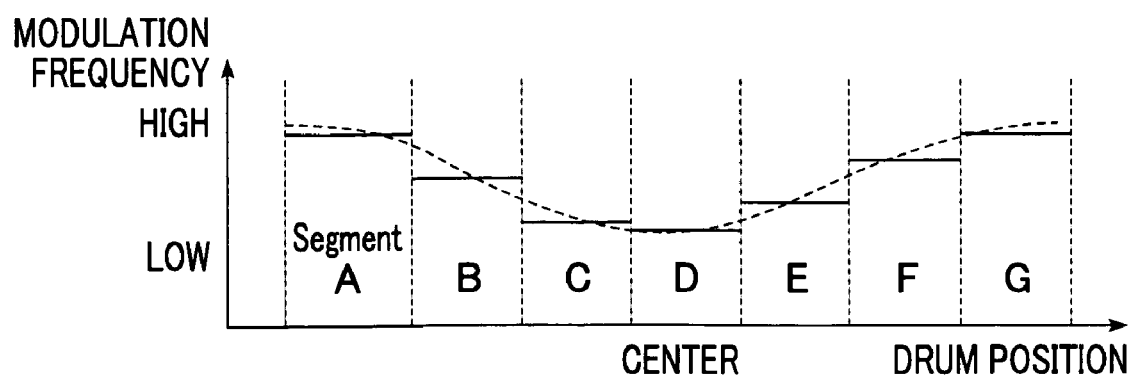
FIG. 6 is a graph illustrating the relationship between the drum position and the modulation frequency, and showing the laser scanning rate and the correction.
Figure 7:
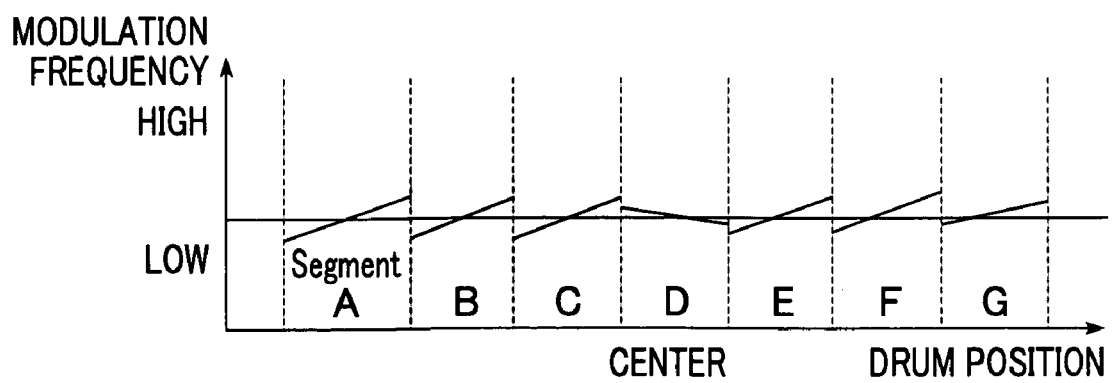
FIG. 7 is a graph illustrating the relationship between the drum position and the modulation frequency, and showing the laser scanning rate and the error after correction.
Figure 8:
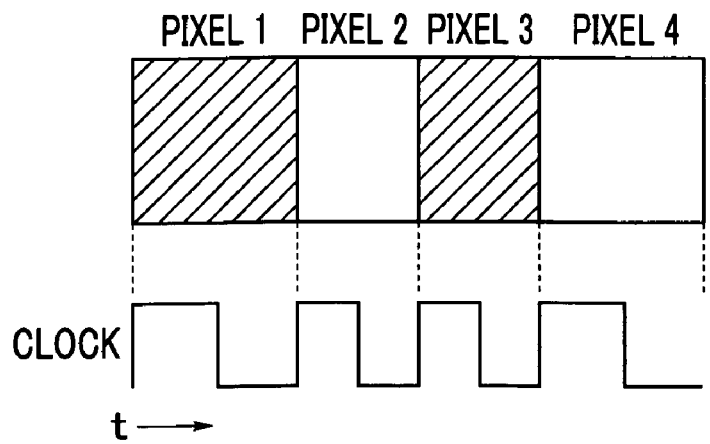
FIG. 8 illustrates the relationship between the modulation clock and the pixel pitch.
Figure 9:
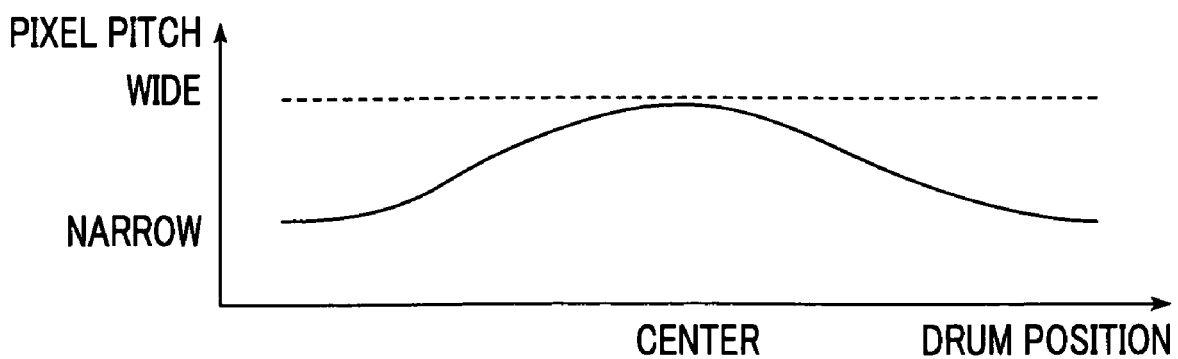
FIG. 9 illustrates the relationship between the drum scanning position and the pixel pitch.

FIG. 3 is a schematic view of the write optical unit 28. The write optical unit 28 includes a laser device 303 emitting a laser beam onto and reflected by a polygon mirror 301 rotationally driven by a motor (not shown) to scan a photosensitive drum 302 along a straight line. In this embodiment, the write optical unit 28 does not include a correcting member, such as an fθ lens. Since the laser beam rotates at a constant speed, it scans the center portion of the drum surface (which is closer to the polygon mirror center) slower than at the longitudinal ends (which is more distant from the polygon mirror center). A laser detector 304, arranged by the side of the photosensitive drum 302 functions as a sensor for detecting the reference position of the laser and determines an irradiating period of image information from the laser device 303. Each face of the polygon mirror 301 corresponds to one scanning line. The mirror 301 uses signals from the laser detector 304 as start timing signals for the individual lines.

Figure 11:
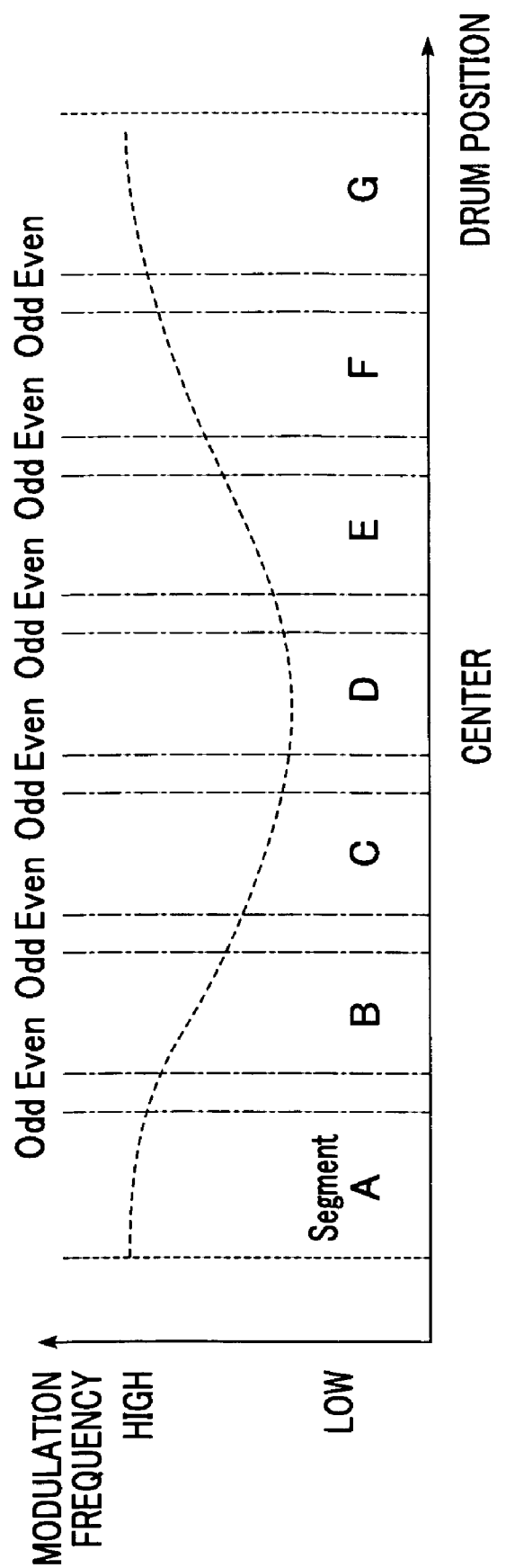
FIG. 11 is a graph illustrating the relationship between the drum position and the modulation frequency, and showing the correction frequency and sampling in the embodiment shown in FIG. 1.
Figure 12:
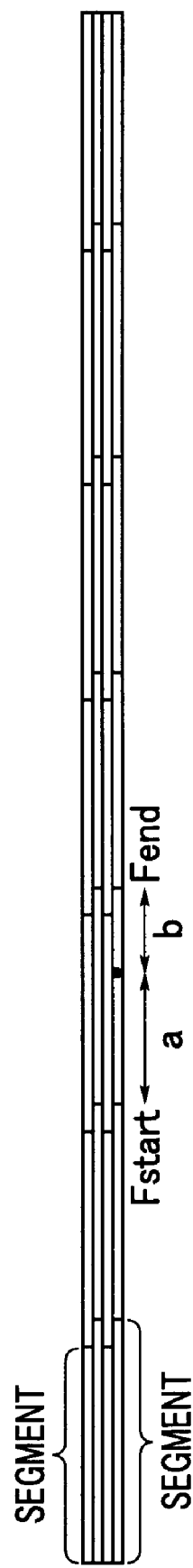
FIG. 12 is a drawing illustrating divided segments in the embodiment shown in FIG. 1.

In this embodiment, as shown in FIG. 11, the laser is controlled by dividing one line into segments, such as segments A to G. As shown in FIG. 12, control is performed by shifting the segment boundary of an even-numbered line rearward by ⅛ segment length relative to an odd-numbered line. In other words, the same segment boundaries in adjacent scan lines are offset with each other.

FIG. 11 shows the process of division, with the abscissa representing the drum position, the ordinate representing the pixel modulation frequency, and the dotted curve representing the corrected frequency. Except for at both ends, the longitudinal broken line suggests that the number of sampling points is different between the odd-numbered lines and the even-numbered lines. More specifically, the register stores at total of fourteen points, and the intervals between the points are calculated by interpolation.

FIG. 14 is a block diagram of an image signal modulation circuit in accordance with one embodiment of the present invention. Frequencies for the segment boundaries are stored in a register 1403 via a CPU bus. A counter 1404, cleared by a start reference signal generated by the laser detector 304 (shown in FIG. 3), outputs segment information, phase information within a segment, and a line phase indicating all odd/even numbers. The clock and the start signal are sent to each block and are used as an operating clock and a reset signal, respectively. The frequency operating section 1405 performs calculations from the segment information, the register setting, and the line phase.

FIG. 12 illustrates the process of segment division in which a rectangle represents a segment, one transverse row represents one line, and a black dot represents the current pixel. In the frequency operating section 1405, corresponding Fstart and Fend are selected from the segment information, the register setting, and the line phase. A frequency F is calculated from pieces a and b of the phase information within the segment by the following formula:

$$F=(b*F\text{start}+a*F\text{end})/(a+b).$$

When the frequency data F is communicated to an image signal modulator 1401, input image data is PWM-modulated and then communicated to the laser device 1402. It is then irradiated to the photosensitive drum via the above-mentioned optical system (shown in FIG. 3) as a modulated beam.

Each photosensitive member 21, rotating in a counter-clockwise direction as shown by the arrow, has a photosensitive member cleaning unit (including a precleaning neutralizer) 212 and a charger 27. Around the photosensitive member 21, there is a rotary developing device 213 in which an M-developing unit 213M, a C-developing unit 213C, a Y-developing unit 213Y, and a Bk-developing unit 213K are held by rotating members. The rotary developing device 213 rotates to form an image with prescribed color toner, and the rotation thereof is controlled so that the developing unit of the prescribed color comes into contact with the photosensitive member 21. The photosensitive member 21 contacts an intermediate transfer belt 22 functioning as an intermediate transfer member. The intermediate belt 22 is stretched around a first transfer bias roller 217 functioning as first transfer means, a driving roller 220 which drives the intermediate transfer belt 22 by a driving motor (not shown), and a group of driven rollers 218, 219 and 237.

Each developing unit in each image forming system mentioned above comprises a developing sleeve which rotates while bringing a brush of a developing agent into contact with the surface of the photosensitive member 21 to develop an electrostatic latent image, and a developing paddle which rotates to suck up and stir the developing agent. A second transfer bias roller 221 is arranged at a position relative to the driven roller 219 such that the intermediate transfer belt 22 is disposed therebetween. The second transfer bias roller 221 has a contact-separation mechanism which allows the roller 221 to move into and out of contact with the intermediate transfer belt 22. A belt cleaning unit 222 is provided adjacent to the driven roller 237 such that the intermediate transfer belt 22 is disposed therebetween. The belt cleaning unit 222 is separated from the belt surface 22 during the period from print start to the end of belt transfer of the image trailing end of the final color. Belt 22 cleaning is carried out by the belt cleaning unit 222 coming into contact with the belt surface 22 by a contacting/separating mechanism (not shown) at a prescribed timing thereafter.

When a full-color toner image is formed on the intermediate transfer belt 22, the contacting/separating mechanism moves the second transfer bias roller 221 into contact with the intermediate transfer belt 22. Before formation of the full-color toner image on the intermediate transfer belt 22, a recording medium passes from a cassette 223, through a feed roller 224 and a conveying roller 226, and to a standby position at a registration roller 225. When the second transfer bias roller 221 comes into contact with the intermediate transfer belt 22, the registration roller 225 is turned on so that the toner image is transferred at a prescribed position onto the recording medium. The registration roller 225 feeds the recording medium to the second transfer bias roller 221. To transfer the toner image on the intermediate transfer belt 22 onto the recording medium, a prescribed transfer bias is applied to the second transfer bias roller 221.

After the transfer step as mentioned above, the recording medium is conveyed to a fixing unit 25. The toner image is melted and fixed by a fixing roller set at a prescribed temperature, thus giving a full-color copy of a high resolution.

After image transfer from the member 21 to the belt 22, the surface of the photosensitive member 21 is cleaned by the cleaning unit 212. After image transfer from the belt 22 to the recording medium, the surface of the intermediate transfer belt 22 cleaned by the cleaning unit 222, thereby completing the copying operation.

Figure 2:
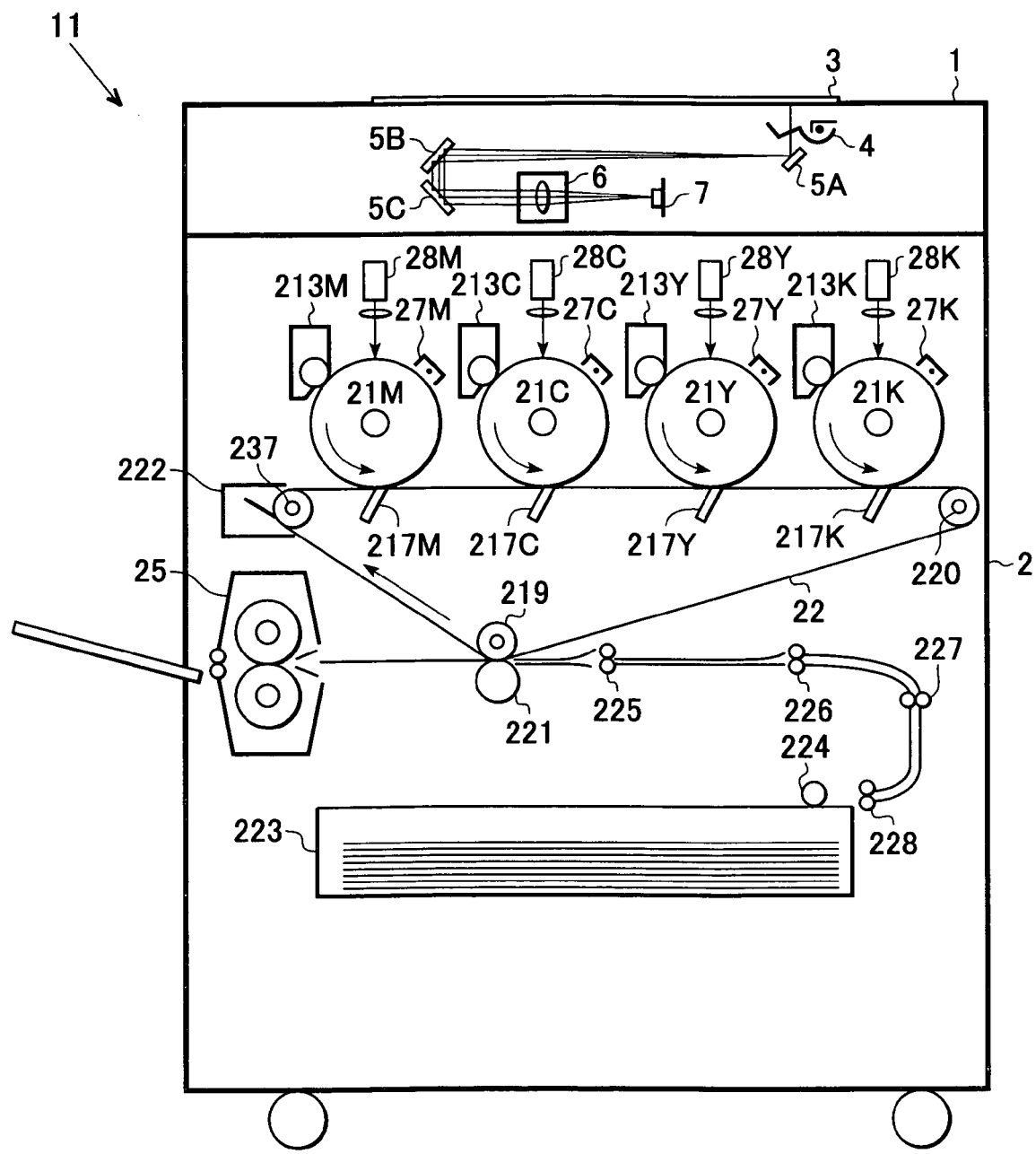
FIG. 2 is a schematic view of an image forming apparatus in accordance with another embodiment of the present invention.

Another embodiment of the present invention is incorporated into a four-drum color copying machine having four photosensitive members arranged in tandem will now be described. FIG. 2 is a schematic view of a color copying machine 11 in accordance with another embodiment of the present invention. The color copying machine 11 includes the color scanner 1 similarly described in the embodiment shown in FIG. 1.

The color copying machine 11 includes the color image recorder/printer 2. In the above-mentioned color printer 2, the color image data from the color scanner 1 are converted into optical signals via write optical units 28M (for magenta), 28Y (for yellow), 28C (for cyan) and 28K (for black), and then written to form an electrostatic latent image onto photosensitive members 21M (for magenta), 21Y (for yellow), 21C (for cyan) and 21K (for black).

Figure 10:
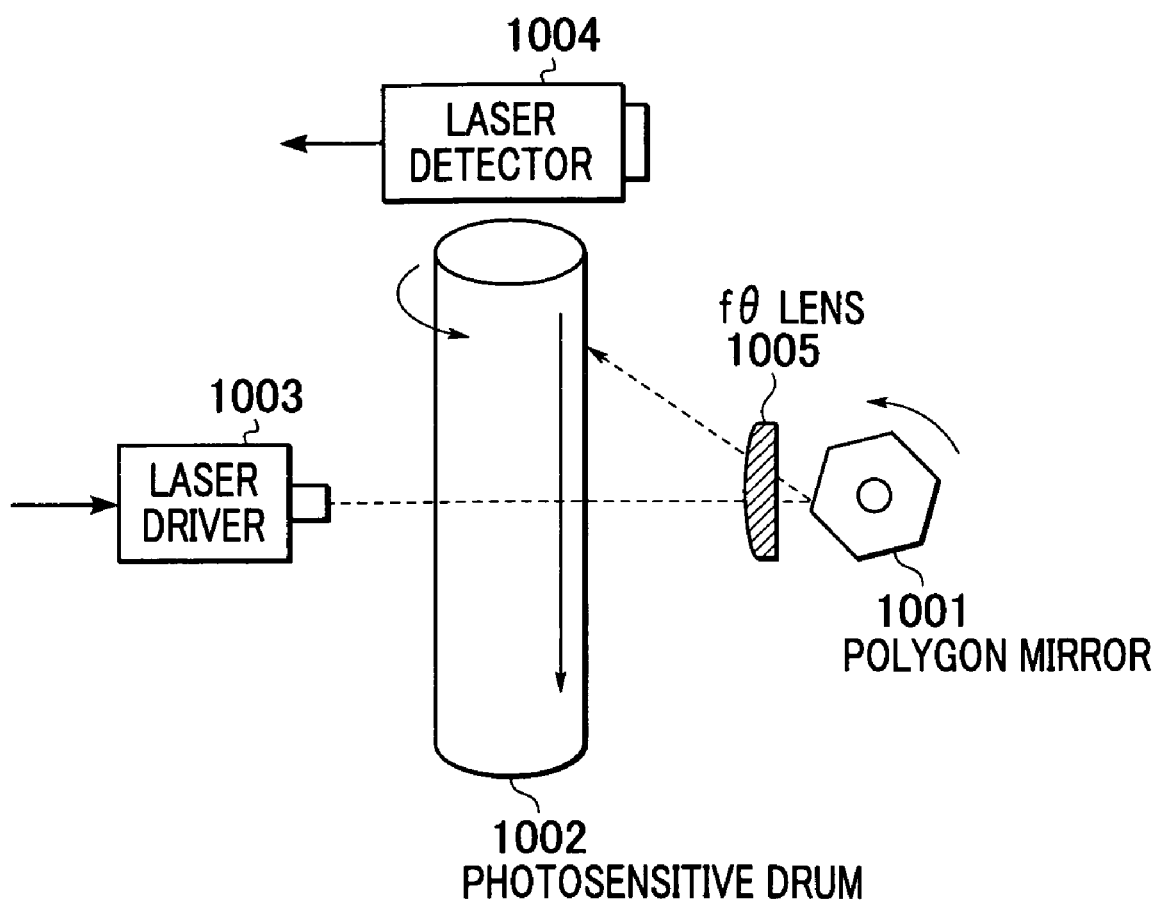
FIG. 10 is a schematic view of a write optical unit with an fθ lens.

The write optical units 28M, 28C, 28Y and 28K have identical mechanisms, whose details will be described with reference to FIG. 10. The laser beam emitting from the laser device 1003 is reflected by the polygon mirror 1001 rotationally driven by a motor (not shown) and scans the photosensitive drum 1002 along a straight line. The components of each write optical unit are arranged such that only the laser beam reflected by the polygon mirror 1001 passes through the fθ lens 1005.

When the laser beam rotates at a constant speed, the drum surface 1002 closest to the polygon mirror center 1001 must be scanned at a slower rate than at the surface of the drum longitudinal ends 1002, which is more distant from the polygon mirror center 1001. The fθ lens 1005, however, corrects this tendency and plays a role of causing the laser beam to pass at a constant speed on the drum surface under the effect of refraction of the light. The laser detector 1004, arranged by the side of the photosensitive drum 1002, functions as a sensor for detecting a reference position of the laser and determines an irradiating period of image information from the laser device 1003. Each face of the polygon mirror 1001 corresponds to one scanning line, in which each face uses signals from the laser detector 1004 for start timing signals for the individual lines.

Figure 13:
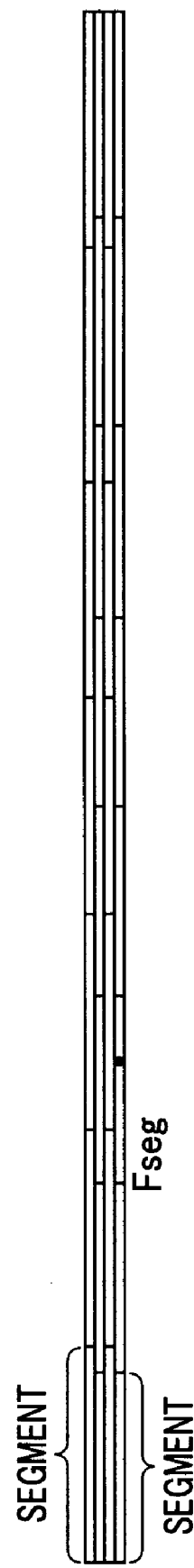
FIG. 13 is a drawing illustrating divided segments in the embodiment shown in FIG. 2.

In this embodiment, as shown in FIG. 13, the odd-numbered lines are divided into eight segments, such as segments A to H, to control the laser. The even-numbered lines are divided into seven segments, such as segments A to G, to control the laser. More specifically, fifteen average values of the amount of correction for the individual segments are stored in a register to make a correction within segments with a constant frequency.

Referring to FIG. 14, frequencies within the segments are stored in the register 1403 via the CPU bus. The counter 1404, cleared by a start reference signal generated by the laser detector 1004, outputs segment information and a line phase indicating all odd/even numbers. The clock and the start signal are sent to each block and are used as an operating clock and a reset signal, respectively. The frequency operating section 1405 performs calculation from the segment information, the register setting, and the line phase, by adding them to the basic frequency F0. FIG. 13 illustrates the process of segment division, in which a rectangle represents a segment, one transverse row represents one line, and a black dot represents the current pixel.

The frequency operating section 1405 selects corresponding Fseg from the segment information and the register setting, and calculates a frequency F by the following formula:

$$F = F0 + F\text{seg}.$$

When the frequency data F is communicated to the image signal modulator 1401, the input image data is PWM-modulated and then communicated to the laser device 1402. The modulated beam is then irradiated to the photosensitive drum via the above-mentioned optical system.

The photosensitive members 12M, 21Y, 21C and 21K, rotating counterclockwise as shown by the arrow, have chargers 27M (for magenta), 27Y (for yellow), 27C (for cyan), and 27K (for black) respectively for the individual colors. An M-developing unit 213M, a C-developing unit 213C, a Y-developing unit 213Y, and a Bk-developing unit 213K contact the photosensitive members 21M, 21Y, 21C, and 21K respectively. The intermediate transfer belt 22 is stretched around first transfer bias blades 217M (for magenta), 217Y (for yellow), 217C (for cyan), and 217K (for black) (functioning as first transfer means for the individual colors), a driving roller 220 which drives the intermediate transfer belt 22 by a driving motor (not shown), and driven roller groups 219 and 237.

Each developing unit of each image forming system mentioned above comprises a developing sleeve which rotates while bringing a brush of a developing agent into contact with the surfaces of the photosensitive members to develop an electrostatic latent image, and a developing paddle which rotates to suck up and stir the developing agent. A second transfer bias roller 221 is positioned relative to the driven roller 219 such that the intermediate transfer belt 22 is disposed therebetween. The roller 221 has a contact-separation mechanism which moves the roller 221 into and out of contact with the intermediate transfer belt 22. A belt cleaning unit 222 is provided adjacent to the driven roller 237 such that the intermediate transfer belt 22 is disposed therebetween. The belt cleaning unit 222 is separated from the belt surface 22 during the period from print start to belt transfer of the image trailing end of the final color. The cleaning unit 222 cleans by coming into contact with the belt surface 22 via a contacting/separating mechanism (not shown) at a prescribed timing thereafter.

When a full-color toner image is formed on the intermediate transfer belt 22, the second transfer bias roller 221 is moved by the contacting/separating mechanism to a position in contact with the intermediate transfer belt 22. Before formation of the full-color toner image on the intermediate transfer belt 22, a recording medium passes from a cassette 223, through a feed roller 224 and conveying rollers 226, 227 and 228, and to a standby position at a registration roller 225. When the second transfer bias roller 221 comes into contact with the intermediate transfer belt 22, the registration roller 225 is turned on so that the toner image is transferred at a prescribed position of the recording medium, and feeds the recording medium to the second transfer bias roller 221. To transfer the toner image on the intermediate transfer belt 22 onto the recording medium, a prescribed transfer bias is applied to the second transfer bias roller 221.

After the transfer step mentioned above, the recording medium is conveyed to a fixing unit 25. The toner image is melted and fixed by a fixing roller set to a prescribed temperature, thus giving a full-color copy of a high resolution.

After belt transfer, the surface of the photosensitive member 21 is cleaned by the cleaning unit 212. After transfer onto the recording medium, the surface of the intermediate transfer belt 22 is cleaned by the cleaning unit 222, thereby completing the copying operation.

A number of the above-mentioned means may be combined. Not only the pixel pitch can be corrected by controlling modulation of the image modulation frequency by laser, but also, the concentration can be corrected by controlling modulation of the laser intensity. For PWM-type concentration control, the effect of concentration control can be achieved by modulating the laser turn-on period within pixels.

According to the present invention, as described above, the image quality can be improved by processing the scanning lines in segments, observing the segment boundary positions, spatially dispersing boundaries of feature patterns of image quality deterioration such as moiré and color shift caused by correction errors, thereby inhibiting such errors to below the visually detectable limit.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A frequency modulation device incorporated in an image forming apparatus having an image carrier and a laser device, the frequency modulation device modulating input image data, and the laser device scanning the image carrier along a plurality of scan lines responsive to the modulated image data, the frequency modulation device comprising:

means for storing frequency information on each of the plurality of scan lines in a format in which each scan line is divided into segments having segment boundaries and the segment boundaries of adjacent scan lines are offset with each other; and means for generating frequency data based on the stored frequency information;

wherein the frequency modulation device modulates the input image data based on the frequency data, wherein said generating means includes a counter generating data including line phase data and segment data and a frequency calculator calculating the frequency data based on the frequency information and the data from the counter.

2. A frequency modulation device according to claim 1, wherein said storing means is a register.

3. A frequency modulation device according to claim 2, wherein the register stores frequency information in a format in which the plurality of scan lines are divided having a same number of segments.

4. A frequency modulation device according to claim 2, wherein the register stores frequency information in a format in which adjacent scan lines are divided having a different number of segments.

5. A frequency modulation device according to claim 2, wherein the register stores frequency information including frequencies at the segment boundaries.

6. A frequency modulation device according to claim 5, wherein the counter generates the data including phase data for each segment of a scan line.

7. A frequency modulation device according to claim 6, wherein the frequency calculator calculates the frequency data based on the segment boundary information and the phase data.

8. A frequency modulation device according to claim 2, wherein the register stores the frequency information including frequency within each segment of a scan line.

9. A frequency modulation device according to claim 8, wherein the register stores the frequency information including average value of amount of correction within each segment of a scan line.

10. A frequency modulation device according to claim 9, wherein the frequency calculator calculates the frequency data by adding the frequency information from the register and the data from the counter to a basic frequency.

11. A method for scanning an image carrier with input image data using a laser device, the method comprising the following steps:

generating a plurality of scan lines of image data;

dividing each scan line into a plurality of segments having segment boundaries such that for adjacent scan lines, the segment boundaries are offset;

providing and storing frequency information for each segment;

generating frequency data based on the stored frequency information;

modulating the image data based on the frequency data; and scanning the image carrier using the laser device along the plurality of scan lines based on the modulated image data, wherein said frequency generating step further includes a step of providing data including line phase data and segment data and a step of calculating the frequency data based on the frequency information, the line phase data and the segment data.

12. A method of claim 11, wherein the step of providing data includes providing phase data for each segment of a scan line.

13. A method of claim 12, wherein the frequency information within each segment includes information on average value of amount of correction within each segment.

* * * * *